United States Patent
Cox et al.

(10) Patent No.: US 6,728,766 B2
(45) Date of Patent: Apr. 27, 2004

(54) METHODS, SYSTEMS AND COMPUTER PROGRAM PRODUCTS FOR LICENSE USE MANAGEMENT ON A NETWORK

(75) Inventors: David E. Cox, Raleigh, NC (US); David L. Kaminsky, Chapel Hill, NC (US); David B. Lindquist, Raleigh, NC (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/829,854

(22) Filed: Apr. 10, 2001

(65) Prior Publication Data

US 2001/0013064 A1 Aug. 9, 2001

Related U.S. Application Data

(62) Division of application No. 09/211,529, filed on Dec. 14, 1998, now Pat. No. 6,324,578.

(51) Int. Cl.[7] .............................................. G06F 15/177
(52) U.S. Cl. ...................... 709/220; 709/223; 709/224; 713/1; 713/2; 713/100
(58) Field of Search ................................ 709/223, 224, 709/220, 229; 705/59; 713/200, 201, 1, 2, 100

(56) References Cited

U.S. PATENT DOCUMENTS

| | | | | |
|---|---|---|---|---|
| 5,204,897 A | * | 4/1993 | Wyman | 710/200 |
| 5,260,999 A | * | 11/1993 | Wyman | 705/59 |
| 5,263,165 A | | 11/1993 | Janis | 395/725 |
| 5,440,739 A | | 8/1995 | Beck et al. | 70/221 |
| 5,554,979 A | | 9/1996 | Kohar et al. | 340/825.72 |
| 5,634,010 A | | 5/1997 | Ciscon et al. | 709/223 |
| 5,655,081 A | | 8/1997 | Bonnell et al. | 709/202 |
| 5,671,412 A | * | 9/1997 | Christiano | 707/104.1 |

(List continued on next page.)

FOREIGN PATENT DOCUMENTS

WO    WO 98/50853    11/1998    ............. G06F/9/44

OTHER PUBLICATIONS

"A Common Desktop Environment for Platforms Based on the UNIX Operating System," By B.E. Cripe, J.A. Brewster, and D.E. Laursen. Hewlett–Packard Journal, vol. 47, No. 2, Apr. 1, 1996, pp. 6–14.

(List continued on next page.)

*Primary Examiner*—Frantz B. Jean
(74) *Attorney, Agent, or Firm*—Myers Bigel Sibley & Sajovec; Jeanine S. Ray-Yarletts

(57) ABSTRACT

Management of configurable applications programs on a network is provided by using two program files for each configurable application program. The two program files are provided to a network server station which operates as the on-demand server for software deployment and may also act as the application server. The on-demand server makes the first (configuration manager) program available to an administrator to obtain preferences for the configurable preferences of the application program which have been designated as administrator preferences. The on-demand server also provides a second (application launcher) program to its client stations. The application launcher program not only provides for a user interface to execute the application program itself but also allows a user to specify one or more of the configurable parameters of the application program. An icon is displayed on the screen of the client station through which a user may initiate execution of the application program. The application launcher program provides the identity of the user to the server along with the request to initiate execution of the application program. The on-demand server then initiates execution of the application program using stored values for the user and administrator set preferences or, if no preferences have yet been obtained for the particular user, obtains user preferences before initiating execution of the application program.

18 Claims, 5 Drawing Sheets

U.S. PATENT DOCUMENTS

| | | | | |
|---|---|---|---|---|
| 5,680,615 A | | 10/1997 | Marlin et al. | 707/103 |
| 5,689,708 A | | 11/1997 | Regnier et al. | 709/302 |
| 5,708,709 A | | 1/1998 | Rose | 380/4 |
| 5,745,879 A | | 4/1998 | Wyman | 705/1 |
| 5,748,896 A | | 5/1998 | Daly et al. | 709/223 |
| 5,752,041 A | * | 5/1998 | Fosdick | 717/178 |
| 5,764,887 A | | 6/1998 | Kells et al. | 713/200 |
| 5,771,354 A | | 6/1998 | Crawford | 709/229 |
| 5,778,368 A | | 7/1998 | Hogan et al. | 707/10 |
| 5,809,251 A | | 9/1998 | May et al. | 709/223 |
| 5,813,009 A | | 9/1998 | Johnson et al. | 797/100 |
| 5,845,065 A | * | 12/1998 | Conte et al. | 713/200 |
| 5,845,077 A | | 12/1998 | Fawcett | 709/221 |
| 5,848,243 A | | 12/1998 | Kulkarni et al. | 709/224 |
| 5,875,327 A | | 2/1999 | Brandt et al. | 713/1 |
| 5,881,236 A | | 3/1999 | Dickey | 709/221 |
| 5,911,066 A | | 6/1999 | Williams et al. | 709/300 |
| 5,933,601 A | | 8/1999 | Fanshier et al. | 709/223 |
| 6,021,438 A | * | 2/2000 | Duvvoori et al. | 709/224 |
| 6,070,190 A | | 5/2000 | Reps et al. | 709/224 |
| 6,098,067 A | | 8/2000 | Erickson | 707/10 |
| 6,105,063 A | | 8/2000 | Hayes, Jr. | 709/223 |
| 6,105,066 A | | 8/2000 | Hayes, Jr. | 709/226 |
| 6,105,069 A | * | 8/2000 | Franklyn et al. | 709/229 |
| 6,108,712 A | | 8/2000 | Hayes, Jr. | 709/246 |
| 6,115,040 A | | 9/2000 | Bladow et al. | 345/335 |
| 6,158,010 A | | 12/2000 | Moriconi et al. | 713/201 |
| 6,175,363 B1 | | 1/2001 | Williams et al. | 345/334 |
| 6,175,832 B1 | | 1/2001 | Luzzi et al. | 707/10 |
| 6,182,142 B1 | | 1/2001 | Win et al. | 709/229 |
| 6,189,051 B1 | | 2/2001 | Oh et al. | 710/33 |
| 6,192,414 B1 | | 2/2001 | Horn | 709/239 |
| 6,195,432 B1 | | 2/2001 | Takahashi | 380/278 |
| 6,202,206 B1 | | 3/2001 | Dean et al. | 717/11 |

OTHER PUBLICATIONS

"Administration of Graphic User Interface and Multimedia Objects Using Cooperative Processing," IBM Technical Disclosure Bulletin, vol. 37, No. 9, Sep. 1, 1994, pp. 675–678, XP000475542.

http://nf/pdc97/profiles_and _policies.htm "Guide to Microsoft Windows NT 4.0 Profiles and Policies" pp. 1–76.

http://www/ieff.org/htlm.charters/acap–charter.html "Application Configuration Access Protocol (acap)," 68 pages.

IBM Network Station Manager for Windows NT Server 4.0, Chapter 5. Using the IBM Network Station Manager, pp. 5–1 to 5–15.

http://www.software.ibm.com/os/warp/library/sq202822.htm, "WorkSpace on–Demand Handbook," Chapters 2.3.1; 6.2; 6.3; 6.3.1; 6.3.3; 6.5.

http://www.triteal.com/SoftNC, Java Desktop Environment from Triteal, pp. 1–2.

http://java.sun.com/products/hot–javaviews/admin.html, "HotJava Views," pp. 1–24.

http://esuite.lotus.com/eSuite/eSuite, "The Right Work Environment for Network Centric Computing," 24 pages.

TME 10 *Software Distribution User's Guide*, Version 3.1, Chapters, 1, 4 and 5.

* cited by examiner

METHODS, SYSTEMS AND COMPUTER PROGRAM PRODUCTS FOR LICENSE USE MANAGEMENT ON A NETWORK

CROSS REFERENCE TO RELATED APPLICATIONS

This application is a divisional of application Ser. No. 09/211,529 filed Dec. 14, 1998 U.S. Pat. No. 6,324,578. This application is related to U.S. patent application Ser. No. 09/211,528 filed Dec. 14, 1998 and entitled METHODS, SYSTEMS AND COMPUTER PROGRAM PRODUCTS FOR CENTRALIZED MANAGEMENT OF APPLICATION PROGRAMS ON A NETWORK. This application is also related to U.S. patent application Ser. No. 09/072,597 filed May 5, 1998 and entitled: Client-Server System for Maintaining a user Desktop Consistent with Server Application User Access Permissions which is incorporated herein by reference in its entirety.

FIELD OF THE INVENTION

The present invention relates to network management in general and in particular to application program management on a computer network.

BACKGROUND OF THE INVENTION

Traditional mainframe computer configurations provided for user interface to the computer through computer terminals which were directly connected by wires to ports of the mainframe computer. As computing technology has evolved, processing power has typically evolved from a central processing center with a number of relatively low-processing power terminals to a distributed environment of networked processors. Examples of this shift in processing include local or wide area computer networks which interconnect individual work stations where each workstation has substantial independent processing capabilities. This shift may be further seen in the popularity of the Internet which interconnects many processors and networks of processors through devices such as, for example, routers. This type of network environment is often referred to as a client-server environment with client stations coupled to and supported by a server station.

In the modern distributed processing computer environment, control over software, such as application programs, is more difficult than where a mainframe operated by an administrator is used, particularly for large organizations with numerous client stations and servers distributed widely geographically and utilized by a large number of users. Furthermore, individual users may move from location to location and need to access the network from different client stations at different times. The networked environment increases the challenges for a network administrator in maintaining proper licenses for existing software and deploying new or updated applications programs across the network.

One approach to reducing software distribution and control problems is to use an application server in which the application programs are installed and maintained on a centralized server which supports a plurality of client stations. In addition, the Systems Management Server (SMS) program from Microsoft Corporation provides an ability to transmit an application program from a server to a number of clients. The SMS system typically allows installation of programs and associated icons at client stations for SMS-enabled applications. A customized install generally must be created by a system administrator for each different version to be installed. Furthermore, once installed at a client, a user must typically use that specific client station. The application generally cannot be automatically deleted from the client station's desktop or automatically upgraded the next time the user starts the application. Similarly, the Tivoli Management Environment (TME) 10™ system from Tivoli Systems, Inc. provides a software distribution feature which may be used to transmit a file package to client and server stations on a network from a central Tivoli™ server.

A further complication in network systems is that, typically, these systems include combinations of network applications and native applications as well as combinations of different connection types and hardware devices. As used herein "native applications" refers to applications which are installed locally on a workstation such that characteristics associated with the native application are stored on the workstation. The combinations of network connections, differing hardware, native applications and network applications makes portability of preferences or operating environment characteristics which provide consistency from workstation to workstation difficult. Furthermore, differences in hardware or connections may create inefficiencies as users move from workstation to workstation. For example, a user may, in a first session, access the network utilizing a high speed connection and a workstation with a high resolution color monitor to execute an application and then, in a later session, access the network to execute the same application from a mobile computer with a monochrome display and a low speed modem connection to the network. Thus, session content, such as color display data or preferences associated with the application, which may have been appropriate for the first session, may be inappropriate or inefficient in a later session.

Efforts to address mobility of uses in a network have included efforts to provide preference mobility such as, for example, Novell's Z.E.N.works™, Microsoft's "Zero Administration" initiative for Windows® and International Business Machines Corporation's (IBM's) Workspace On Demand™. However, these solutions each typically require pre-installation of software at the workstation to support their services. For example, Novell's Z.E.N. and IBM's Workspace On Demand utilize a designer-supplied support layer in the operating system to enable their services. In addition to modifying the workstations operating system at startup to setup tasks to customize the user's environment, the Microsoft Zero Administration solution may be limited to a homogeneous environment where the workstation and the server are utilizing the same operating system.

Another approach to centralized management is the traditional mainframe model, such as with the IBM 3270 system, or an X Windows environment. However, in each of these approaches, the client device is treated as a dumb terminal with execution of the applications occurring at the server rather than the client. Accordingly, the communication between the server and the client is typically presenting characters for a display screen of the client and/or receiving key strokes from the client. Windows Zero Administration, as described above, is client rather than user oriented and installs applications on client stations which do not fully support roaming by users. The JAVA™ environment utilized on the Internet for web applications provides an ability for hardware independent application development but fails to provide an integrated framework for presenting multiple independent applications to a user. While various web applications do allow personalizing of a specific application display by user, this capability is generally not managed across applications for a user. Furthermore, it typically associates personalized screen information with an Internet address which is client device rather than user associated, therefore limiting its ability to support roaming by users.

Each of these "mobility" systems typically do not address the full range of complications which may arise in a heterogeneous network utilizing differing devices and connections. The systems typically will not present application choices associated with the user and for which the user is authorized but instead present information associated with the particular client workstation. Users would typically have to manually define session characteristics at each differing workstation they used in the network or maintain local characteristic definitions which may be inappropriate for particular applications a user is executing and may substantially reduced the administrative convenience of a centrally controlled network. Thus, these various approaches fail to provide a seamless integration of application access and session characteristics across heterogeneous networks. Such solutions may, at most, reduce network administration only after initial installation on each workstation. In addition, control over access to applications by users is difficult to accomplish in a mobile environment.

An additional user based application management capability not fully supported by these various approaches is license use management. License use management typically involves controlling how many users can use an application. A distributed network environment with a plurality of client stations and a plurality of different users accessing the applications from different clients increases the challenge associated with managing license use to insure compliance with limitations established by software designers. These environments also typically require various steps in the installation process to occur at different locations rather than allowing the entire process to be controlled from a single point for an entire managed network environment.

SUMMARY OF THE INVENTION

Accordingly, it is an object of the present invention to provide methods, systems and computer program products for management of configurable application programs on a computer network which allow a mix of user and system administrator defined configurable preferences to be associated with specific application programs.

It is a further object of the present invention to provide such methods, systems and computer program products that can accommodate various types of hardware operating under different operating systems across client stations.

These and other objects are provided, according to the present invention, by providing two program files for each configurable application program which are provided to a network server station which operates as an on-demand server for software deployment and may also act as the application server. The on-demand server makes the first, or configuration manager, program available to an administrator classified user (either remotely at a client station or at a direct interface to the server station) to provide an interface to establish preferences for the configurable preferences of the application program which have been designated as administrator only settable. The on-demand server also provides a second, or application launcher, program to client stations on the network and served by the on-demand server. The application launcher program not only provides for a user interface to execute the application program itself but also allows a user to specify one or more of the configurable parameters of the application program. An icon is displayed on the screen of the client station through which a user may initiate execution of the application program. The on-demand application launcher may also obtain a license for the requesting user before initiating execution thereby providing centralized license management support.

The application launcher program first determines the user identity (ID) and provides the user information to the server along with the request to initiate execution of the application program. The application program is then executed using stored values for the user and administrator set preferences or, if no preferences have yet been obtained for the particular user (or new preferences are desired), user preferences are obtained before initiating execution of the application program itself. A profile manager program on the on-demand server provides a user interface and maintains profile information for each client (hardware related) and user (preferences) for all managed configurable application programs available on the on-demand server. The profile manager program may also control access to various applications based on user authorization information.

In one embodiment of the present invention methods, systems and computer program products are provided for management of configurable application programs on a network. An application program having a plurality of configurable preferences and a plurality of authorized users is installed on a server coupled to the network. An application launcher program associated with the application program is distributed to a client coupled to the network. A user set of the plurality of configurable preferences associated with one of the plurality of authorized users executing the application launcher program is obtained and an administrator set of the plurality of configurable preferences is obtained from an administrator. The application program is then executed using the obtained user set and the obtained administrator set of the plurality of configurable preferences responsive to a request from the one of the plurality of authorized users. The request may be received from the one of the plurality of authorized users through the application launcher program.

In another embodiment of the present invention, a configuration manager program associated with the application program is distributed to a second client coupled to the network and the administrator set of the plurality of configurable preferences is obtained from an administrator executing the configuration manager program. The administrator may be one of the plurality of authorized users who is authorized to execute the configuration manager program. In one embodiment of the present invention, an icon associated with the application program is displayed on a screen-of the client and an authorized user may execute the application launcher program by selecting the displayed icon.

In one embodiment of the present invention, obtained user sets and obtained administrator sets are stored on a storage device coupled to the server and retrieved from the storage device when initiating execution of the application program. Default preference values may be provided and used for any of the plurality of configurable preferences which are not specified by the user set or the administrator set. Furthermore, the default preference values may be also be stored on the storage device coupled to the server.

In a further aspect of the present invention, security may be provided by determining if a user requesting execution of the application program is one of the plurality of authorized users. This aspect may also be combined with the license use management aspects of the present invention to further control access to managed application programs.

In another embodiment of the present invention, additional application programs are managed according to the teachings of the present invention along with user preferences obtained from a plurality of users. Furthermore, for each application program, associated application launcher programs may be distributed to a plurality of client stations and obtain user preferences from a plurality of users.

In a further embodiment of the present invention, methods, systems and computer program products are provided for management of configurable application programs on a network. An application program having a plurality of configurable preferences and a plurality of authorized users is installed on a server and an application launcher program associated with the application program is distributed to a client. A user set of the plurality of configurable preferences is obtained from one of the plurality of authorized users executing the application launcher program and an administrator set of the plurality of configurable preferences is obtained from an administrator The application program is then executed using a stored user set and the administrator set of the plurality of configurable preferences responsive to a request from the one of the plurality of authorized users.

In another embodiment of the present invention, methods, systems and computer program products are provided for management of configurable application programs on a network including receiving an application launcher program associated with an application program having a plurality of configurable preferences from a server. A user set of the plurality of configurable preferences from one of the plurality of authorized users executing the application launcher program is provided to the server. The server is also requested to provide an instance of the application program and a stored user set and an administrator set of the plurality of configurable preferences for use in executing the application program responsive to a request from the one of the plurality of authorized users.

In a further aspect of the present invention, methods, systems and computer program products are provided for management of license use for a network. License management policy information for a plurality of application programs is maintained at a license management server. Requests are received at the license management server for a license availability of a selected one of the plurality of application programs from a user at a client. The license management server determines the license availability for the selected one of the plurality of application programs for the user based on the maintained license management policy information and provides an unavailability indication to the client responsive to the selection if the license availability indicates that a license is not available for the user or an availability indication if the licensed availability indicates that a license is available for the user. The request may be received from an application launcher program associated with the selected one of the plurality of application programs and the availability or unavailability indication may be provided to the application launcher program. In one embodiment, the license management server is an on demand server associated with the client which provides an instance of the selected one of the application programs to the client for execution.

While the invention has been described above primarily with respect to the method aspects of the invention, both systems and computer program products are also provided.

Accordingly, the present invention provides for management of configurable application programs in a network environment from a central on-demand server location while allowing for user preferences to be tracked independent of hardware location of the user. This provides for reduced costs and increased uniformity in managing software in a network environment by delivering configured applications when demanded by a user. It further provides an essentially hardware transparent ability for an individual user to interface to an on-demand server supported client station while maintaining the user's personal preferences for each application program.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods, systems or computer program products. Accordingly, the present invention may take the form of a hardware embodiment, a software embodiment or an embodiment combining software and hardware aspects.

Figure 1:
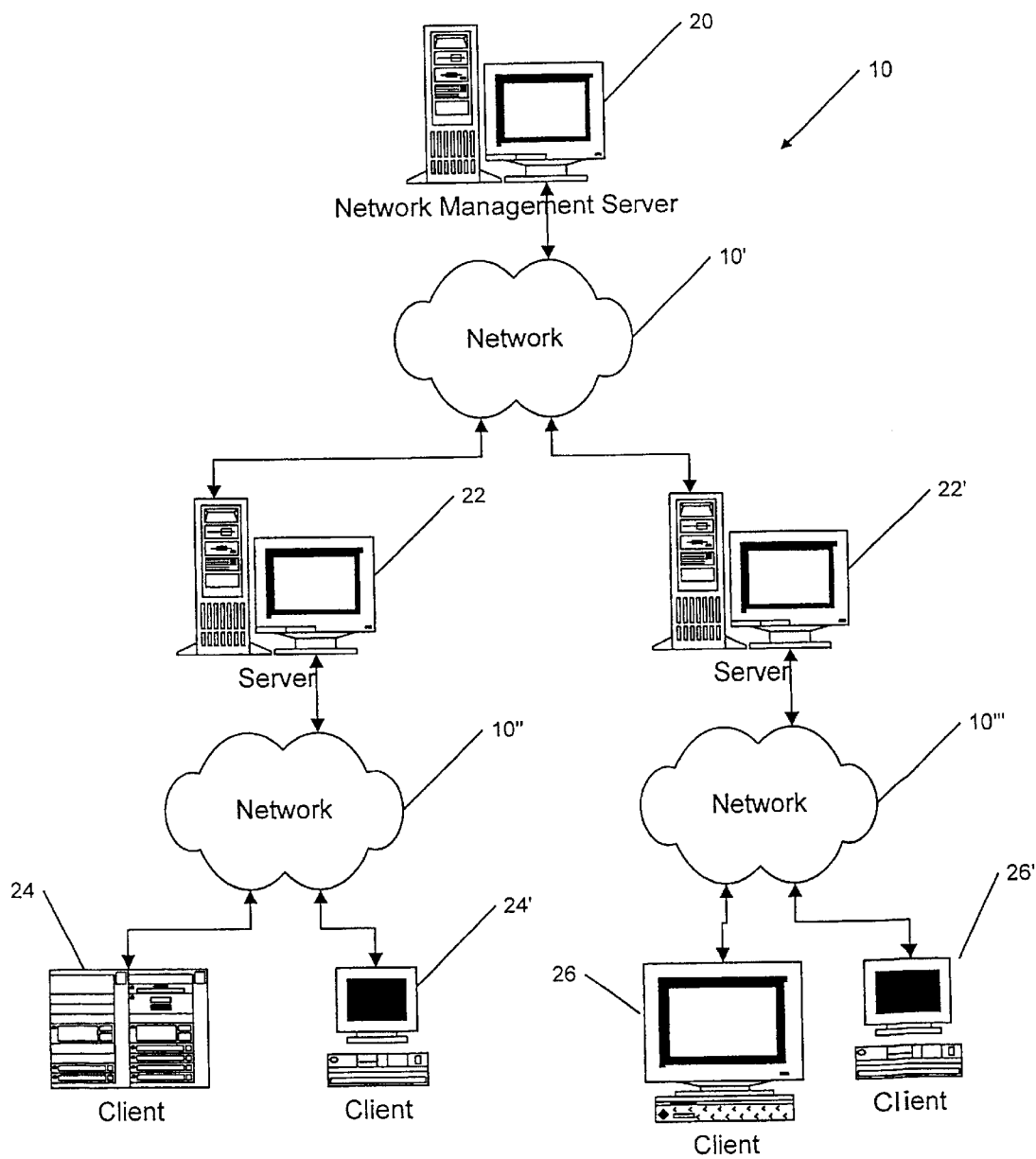
FIG. 1 is a schematic diagram of a computer network with configurable application program management according to an embodiment of the present invention.

FIG. 1 illustrates an embodiment of a computer network including configurable application program management capabilities according to an embodiment of the present invention. Computer network system 10 includes a network management server such as a Tivoli™ server 20 and on-demand servers 22, 22'. As used herein, "on-demand" refers to a server delivering applications as needed responsive to user requests as requests are received. System 10 further includes client stations 24, 24', 26, 26'. As illustrated, on-demand servers 22, 22' are connected to Tivoli™ server 20 over a first network segment 10'. Client stations 24, 24' are served by on-demand server 22 and communicate over network 10''. Similarly, clients 26, 26' are served by server 22' and communicate over network 10'''. As schematically illustrated in FIG. 1, client stations 24, 24', 26, 26' may be hardware from a variety of designers operating a variety of different operating systems.

System 10, as illustrated in FIG. 1, is a centrally managed computer network with Tivoli™ server 20, acting as the central administration station executing network management software such as TME 10™ from Tivoli Systems, Inc. Servers 22, 22' act as on-demand servers for their respective associated client stations 24, 24', 26, 26' and provide for client/server application support. It is further to be understood that networks 10', 10", 10''' may be separate physical networks, separate partitions of a single physical network or may be a single network. Furthermore, Tivoli™ server 20 may be configured to allow for direct communication between server 20 and clients 24, 24', 26, 26'.

Tivoli™ server 20 provides a means for software distribution and management in computer network system 10. Furthermore, on-demand servers 22, 22' each provide an application management system for managing configurable application programs using both user and administrative preferences for various application programs. More particularly, as described in the embodiments herein, on-demand servers 22, 22' are configured to operate within the eNetwork™ environment available from International Business Machines Corporation (IBM). An on-demand server which may be modified according to the present invention is described in U.S. patent application Ser. No. 09/211,528 which is incorporated herein by reference in its entirety. However, while the present invention may be implemented in this environment, it is also suitable for use with other client/server and network management environments.

Operations of the present invention will now be described with respect to the flowcharts of FIGS. 2 through 5. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 2:
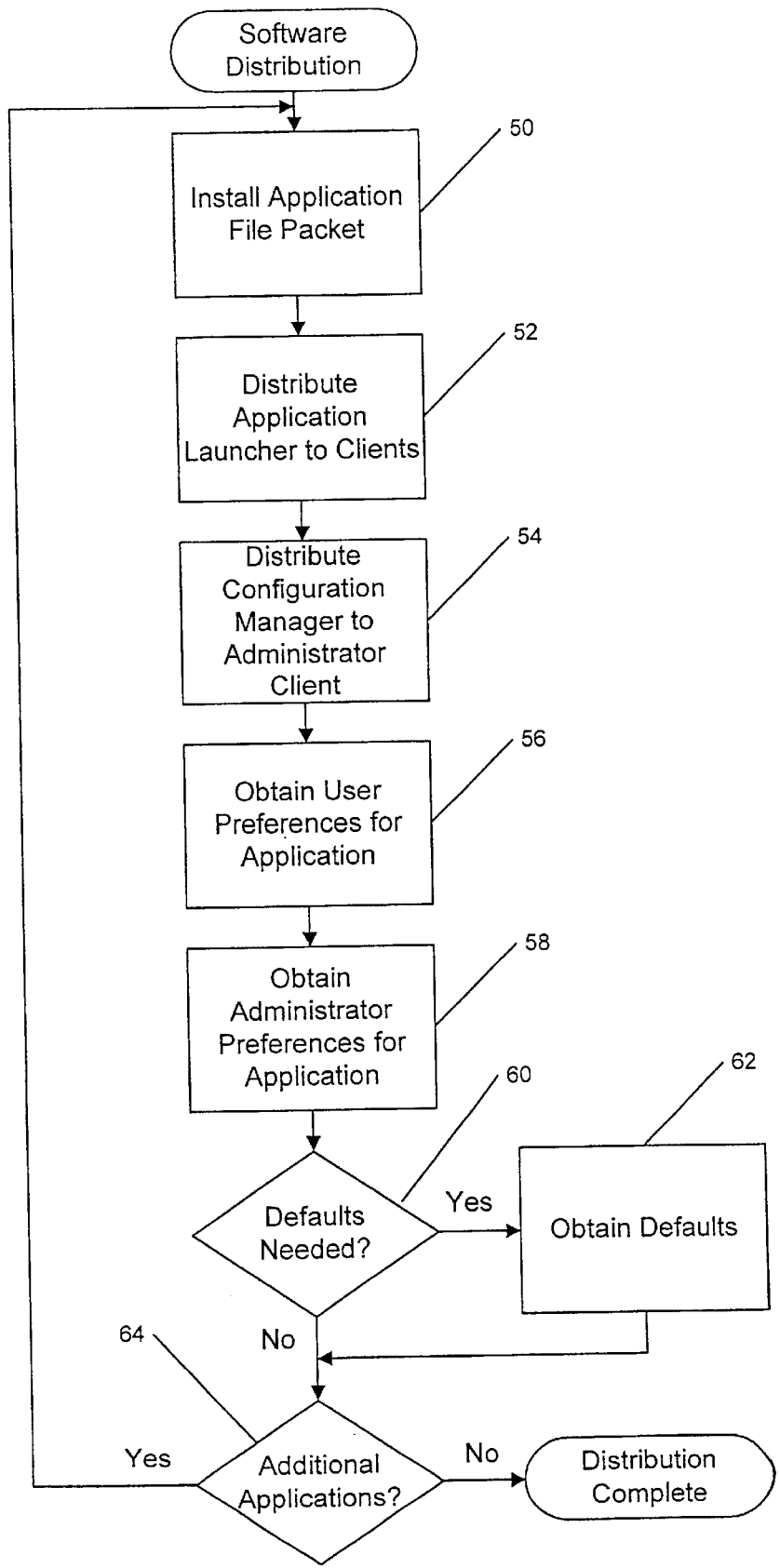
FIG. 2 is a flowchart illustrating operations for application program distribution to clients on a computer network according to an embodiment of the present invention.

Referring now to the flowchart of FIG. 2, operations for distribution of an application program having configurable preferences and implementing management of configurable application programs on a network according to an embodiment of the present invention will now be described. At block 50, an application program having a plurality of configurable preferences and a plurality of authorized users is installed on server 22 coupled to network 10". This may be accomplished, for example, by placing the application program compact disc (CD) in a compact disc read only memory (CD ROM) drive coupled to on-demand server 22. Alternatively, as is described in U.S. patent application Ser. No. 09/211,528 with reference to FIGS. 5–7, the application program may be provided to on-demand server 22 from a central location such as Tivoli™ server 20.

The application program file packet installed at block 50 according to the present invention includes an application launcher and a configuration manager. As described herein, application program management is provided in a JAVA™ (Sun Microsystems, Inc.) programming environment and the application launcher and configuration manager are each "applets" available to on-demand server 22 from the application program CD. It is further to be understood that, in the JAVA™ environment, currently available web browser applications are known to those of skill in the art which provide a user interface and allow hardware independent communication such as that currently specified by Internet protocols. Thus, the application launcher programs may be applets which display the icon which are associated with a web browser Universal Resource Locator (URL) which points to the location of the applet to be executed. Upon selection of the icon displayed by the application launcher, the selected application is "launched" by requesting the URL of the application from the on-demand server. Such requests may be made utilizing conventional Hyper-Text Transfer Protocol (HTTP) communications or other suitable protocols.

At block 52, the application launcher applet is distributed by server 22 to specified supported clients 24, 24'. Various levels of access control may be provided for each application program according to the present invention. For example, the application launcher applet may be distributed to each supported client of server 22. Similarly, all users may be considered authorized users for any particular application or a subset of the user known to server 22 may be designated as authorized users for a particular application program. Accordingly, access to an application program may be limited to only specific users regardless of hardware location on which the application launcher is initiated. Optionally, access may also be limited to only specific hardware locations regardless of user.

Furthermore, it is to be understood that the application launcher may be distributed when the user desktop is initiated and may only contain code required to obtain the application program's executable code and the appropriate code to obtain preferences (such as a URL for the application program and an associated icon for display) from the server on-demand (i.e., when execution is requested by a user). The application launcher program is then fully distributed to the client when execution of the application program is requested by the user. This minimizes the memory required at clients 24, 24', 26, 26'. Alternatively, the application launcher may contain all the executable code before execution is requested.

At block 54, the configuration manager applet is distributed to one of the supported client stations 24, 24'. Alternatively, the configuration manager applet may be installed only locally at server 22 in which case an administrator may only access the configuration manager to update preferences from the user interface of server 22.

At block 56, a user set of the plurality of configurable preferences is obtained which is associated with one of the plurality of authorized users of the application program. In particular, preferences are obtained which are associated with the user executing the application launcher applet at one of the client stations 24, 24'.

An administrator set of a plurality of configurable preferences for the application program is obtained from an administrator at block 58. The administrator is typically an authorized user who is designated by on-demand server 22 as being an administrator authorized user. The administrator provides the administrator set of preferences by executing the configuration manager applet at a client 24, 24' or directly at server 22. Control over setting of the administrator set of preferences may be provided by only authorizing a designated administrator to execute the configuration manager applet.

The designation of user versus administrator settable preferences may be established by the software designer providing the configurable application program. This may be accomplished, for example, by only providing a user interface to a limited number of preferences in the application launcher applet distributed as part of the application file packet. An interface to obtain input of the remaining preferences may only be provided in the configuration manager applet. For example, a designer of a terminal emulator application program may provide a preference setting for available host computers as an administrator level setting while providing keyboard mapping, screen configuration and destination host preference values as user settable. Furthermore, the configuration manager applet may include only a configuration screen allowing setting of preferences without including the user interface and code access allowing the administrator to run the application program itself. In other words, an administrator would need to initiate execution of the application launcher applet in order to obtain access to the terminal emulator and would use the configuration manager applet only to set administrator preferences. The application launcher is able to read all preferences needed for execution of an instance of the application program although, typically, only some of the preferences will be user configurable.

Under certain circumstances, preference values required to execute the application program itself may not be properly provided by either the user or the administrator. Accordingly, as illustrated at block 60 of the embodiment of FIG. 2, server 22 determines if any default values are required for any of the preferences. If default values are required, they are obtained at block 62. The default values may be obtained from a storage device coupled to server 22. Various approaches may be utilized for specifying default values. For example, an application vendor may ship a file with the application program that specifies the default values. Alternatively, an administrator could store preferences at the all user group level providing default values for all users and/or groups. In another embodiment, thte application itself may contain default values coded into the application allowing the application itself to provide default values if no stored default values are available.

If no additional application programs are to be distributed as determined at block 64, software distribution is complete. If it is desired to distribute additional application programs, operations return to block 50 and continue as described above.

Figure 3:
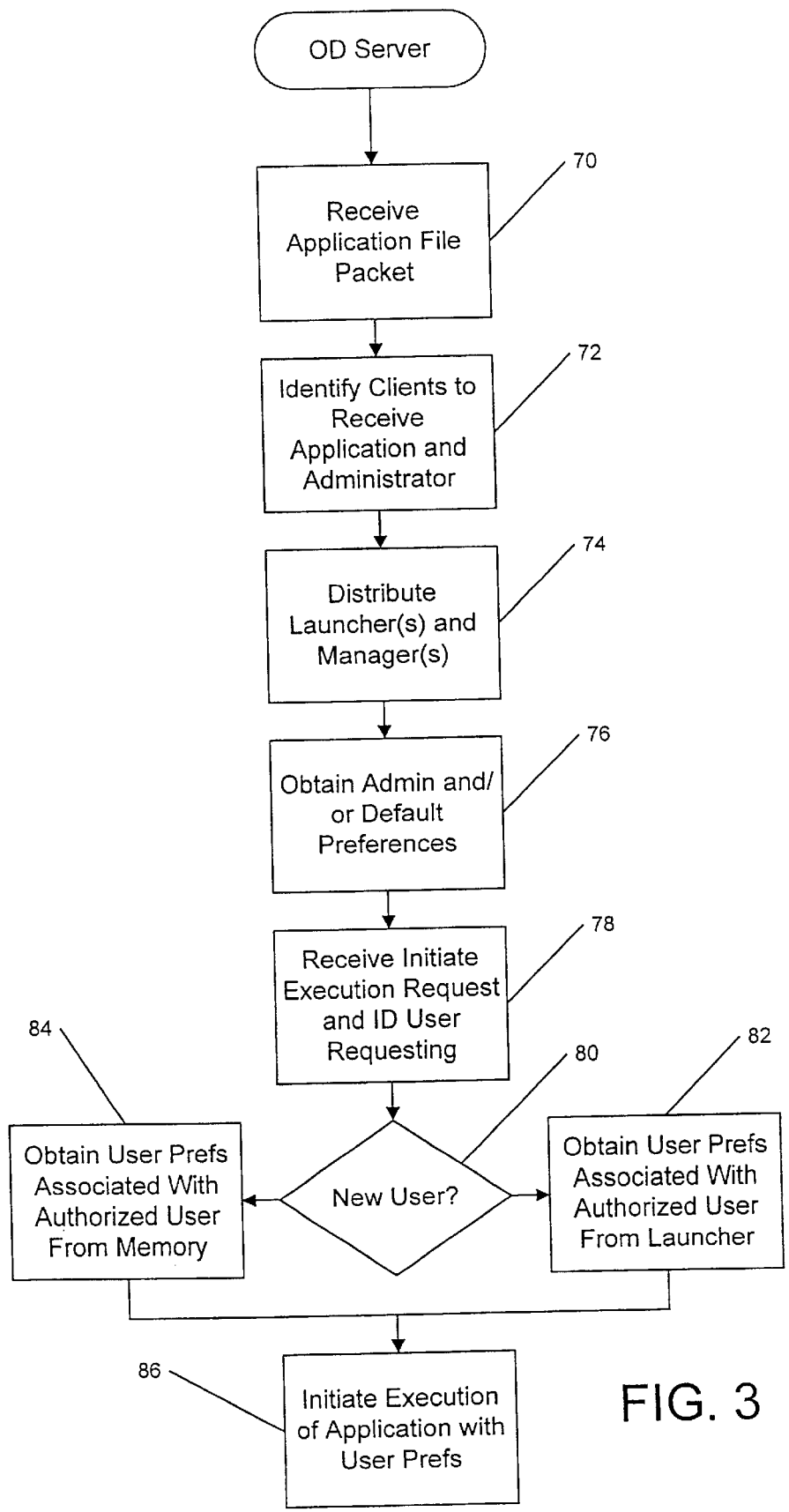
FIG. 3 is a flowchart illustrating operations for application program distribution and execution from the server perspective according to an embodiment of the present invention.

Referring now to FIG. 3, operations for blocks 50–58 of FIG. 2 and further for initiation of execution of the application program will be described from the perspective of on-demand server 22 for an embodiment of the present invention. At block 70, on-demand server 22 receives the application program file packet as described previously. At block 72, on-demand server 22 identifies which clients 24, 24' are to receive the application launcher program and the configuration manager program. On-demand server 22 further determines which users are authorized to access the application program at block 72. At block 74, server 22 distributes the application launcher and the configuration manager.

The administrator set of preferences for the application program is obtained by server 22 at block 76 and is stored on a storage device coupled to server 22. In addition, default values for the various preferences may be obtained and stored as the initial preference values at block 76 for user preferences for all authorized users and for administrator only preference settings.

On-demand server 22 receives a request to initiate execution of the application program at block 78. The request received by server 22 includes an identification of the user who initiated the request. This allows server 22 to determine if the user is an authorized user for the application program before providing an instance of the application program for execution. It is also used by server 22 to obtain the correct user specified preferences and provide a stored set of user and/or administrator preferences for the application program for a particular user.

At block 80, server 22 determines if the user requesting execution of the application program is requesting execution for the first time or if a new set of user preferences is being provided by the user. If a requesting user is a new user, at block 82, the user's preferences for the application program are obtained from the user and stored on a storage device coupled to server 22. As will be described further with reference to FIG. 4, the preferences are provided by the user executing the application launcher program at a client station. If new user preference settings are not required, stored user preference values associated with the authorized user as well as stored administrator and, when necessary, default values are obtained from memory as indicated at block 84.

The application program is then executed at block 86 using the retrieved user set and administrator set of configurable preferences. Accordingly, regardless of what client station 24, 24' an authorized user initiates the application launcher program through, the application will execute using an individual user's own preferences, thereby providing a substantially uniform interface to a user across a variety of hardware locations. Furthermore, while the description herein has been directed to operations with respect to a single server 22, it is to be understood that the present invention may also be provided utilizing a storage device that is shared between a plurality of servers 22, 22' or by separate but synchronized databases of preferences values at each of the two servers, thereby allowing an individual authorized user to obtain execution of an application program using their own preferences at any of workstations 24, 24', 26, 26'.

Figure 4:
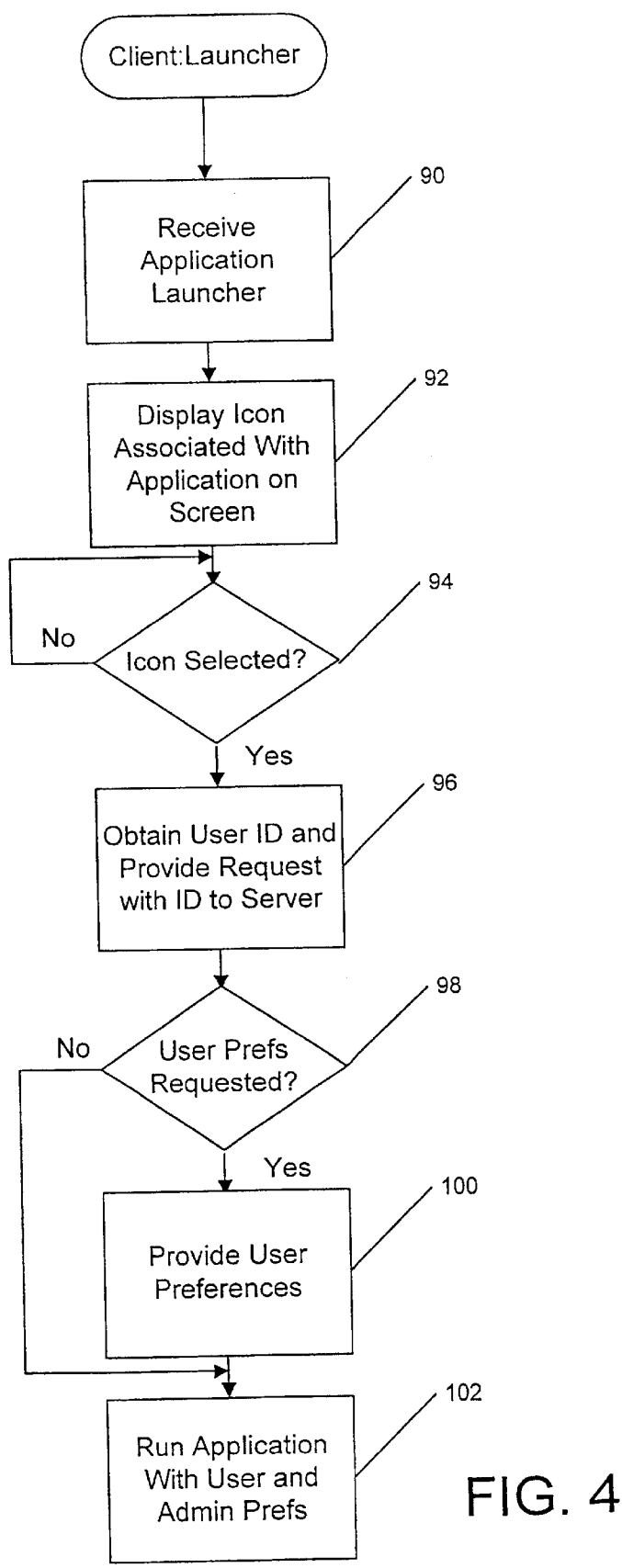
FIG. 4 is a flowchart illustrating operations for application program distribution and execution from the client and user perspective according to an embodiment of the present invention.

Referring now to FIG. 4, operations according to an embodiment of the present invention will be described from the perspective of the application launcher program executing in a client station 24, 24'. At block 90, client 24 receives the application launcher program which performs the main end-user function of the application program and further provides an interface allowing the end-user to configure a set of preferences. The client 24 displays an icon associated with the application program on a screen of the client station as illustrated at block 92. For the JAVA™ based embodiment of the present invention described herein, a browser interface is used between on-demand server 22 and client 24. The display icon is displayed through the browser's graphic user interface representing the users' desktop and allowing an authorized user to execute an application program by selecting the displayed icon of the application launcher program, typically through use of a mouse.

With the browser program executing on the client 24, the client awaits selection of an icon as illustrated at block 94. Once a user selects the application launcher icon at block 94, a user identifier is obtained by client 24 as illustrated at block 96. (This identifier may be obtained at the start of a session and stored for later use or requested each time an application launcher program icon is selected.) In the client/server application environment of the illustrated embodiment of the present invention, client 24 then requests initiation of execution on server 22 with a request including the user identifier to allow server 22 to determine both user preferences and confirm the authorized status of the user.

At block 98, client 24 determines if user preferences have been requested by on-demand server 22 (or the user has requested new preferences). If user preferences are requested, the application launcher program obtains the preferences from the user and provides them to server 22 at block 100. The client/server application program is then run as illustrated at block 102 using the user preferences and the administrative preferences (or default preferences). It is to be understood that a user may update his preferences at blocks 96 and 98 regardless of whether preferences have previously been provided for the application program by the user. Accordingly, users may update their preference values at any point and the new preference values will, in turn, be stored for future use by on-demand server 22.

While the description above was generally provided for a particular sequence and distribution of operations between a server and a client, it is to be understood that functions may be divided differently and at different times according to the teachings of the present invention. Alternative preferred embodiments are described in U.S. patent application Ser. No. 09/211,528 which has been incorporated herein by reference in its entirety. One of these alternatives will now be generally described again herein.

In one embodiment, the application launchers for individual application programs are distributed when a user desktop is initiated (populated) and may only contain code required to obtain user preferences and/or license information and the application program's executable code from the server on-demand (i.e., when execution is requested by a user). This minimizes the memory required at clients 24, 24', 26, 26'. Alternatively, the application launcher may contain, at the client, all the executable code comprising the application program itself before execution is requested. As the application program supported by server system 22 may be executable via a variety of users concurrently, server system 22 provides an instance of the selected one of the plurality of application programs to populate the application launcher to clients 24, 24', 26, 26' for execution responsive to a selection of the application program from the user. Alternatively, while it is not a preferred approach, the application program code itself may be included in the application launcher at the time the user desktop interface is populated allowing an instance of the application program to be executed with less communication traffic between the network and the server associated with the request to initiate an instance of the application program.

The application launcher program, as described above, is distributed for each authorized application program to the clients 24, 24', 26, 26' at the time of establishment of the user desktop interface without including all of the executable code of each application as part of the application launchers at the time of distribution. The application launcher applet then detects selection by the user of the application program's associated icon from the user desktop interface at clients 24, 24', 26, 26' and requests an instance of the selected one of the plurality of application programs associated with the icon from server system 22. The application launcher program then populates clients 24, 24', 26, 26' with the instance of the selected application program for execution. The appropriate configurable user preference information for the selected application program may then be obtained from the server system 22 by execution of the related portion of the downloaded code for use in executing the instance of the application program at the clients 24, 24', 26, 26'. Accordingly, it is to be understood that the preference information is obtained by the application launcher which further includes the application program itself for execution at the client. As with the initial split in downloading code, the code for obtaining preference information may be separately downloaded before the code for the application program itself.

Accordingly, as used herein, it is to be understood that the term "application program" generally refers to the code associated with the underlying program functions, for example, Lotus Notes or a terminal emulator program. However, it is to be understood that the application program will preferably be included as part of the application launcher which will further include the code associated with managing usage of configurable application programs on a network according to the teachings of the present invention. Further it is to be understood that, as used herein, the term "application launcher program" may refer to the entire program provided by a software vendor or to merely a portion thereof distibuted to a client to perform particular operations. For example, the application launcher program distributed to initially populate the user desktop preferably does not include the code associated with the underlying application program and obtaining preferences which may only be distributed to the client later when execution of the application program is requested. The application launcher program distributed to populate the user desktop may only include a URL and an associated ICON and, possibly, code to allow obtaining of user identification and password information. Memory usage on the client stations may thereby be limited.

One further aspect of a managed application environment according to the present invention is the ability to provide for license use management. License use management involves controlling how many users can use a particular application. License use, according to the present invention, is managed by setting certain policies, such as the limit of the number of users, whether crossing the limit of users is allowed or not and how users are counted (simultaneous number logged on, total number of clients that can use the application, and so on). For many applications, the license use policy is initially defined by the software designer for the application that may or may not allow these policies to be modified by a purchaser.

Pursuant to the teachings of the present invention, server system 22 stores license use management policy information in a hierarchal centralized preference database 208. This provides flexibility in management of licenses. For example, the application being managed may retrieve its license use policy based on the user that is requesting initiation of an instance of the application. Furthermore, as a separate configuration framework is provided for an administrator, the administrator may configure any non-default policies that are allowed to be configured by the software designer. The software designer further may establish default policies and define which policies, if any, can be changed by the administrator and/or an end user.

As with the control of the user preferences described herein, a software designer for an application supported by managed application server system 22 provides two separate programs for each application. The first is the application itself provided as an application launcher applet. The application launcher is configured to read a set of license policies, for example, by using the preference Application Program Interface (API) for the user that is requesting initiation of an instance of the application. The application launcher may then initiate appropriate calls to register the kind of license specified by the policy with server system 22 for centralized storage and management. Each time an instance of an application is initiated by a user request to the system server 22, license information is provided to the application as will be described further with reference to FIG. 5. As described previously, if any end-user customizable license policy information is authorized, the application launcher applet would further support a user interface for obtaining this information as described previously with respect to various user configurable preferences. Typically, no such interface for end users will be required for a license use management and no user interface will be provided to modify a license policy. Instead, license information will be provided as read only information to the end user application launcher.

The second program provided by the application writer provides the configuration management application for use by an administrator as discussed previously. This application may allow the administrator to customize for the specific application the policy information for the global default, specific users or specific groups. The software designer may limit which license policy parameters may be changed by the administrator by the appropriate formatting of the configuration management application. Preferably, the software designer also provides and ships with the application the default policies. The default policies may be configured to be overwritten depending upon whether the software designer has provided for either administrator or user overrides to licensed policy.

Figure 5:
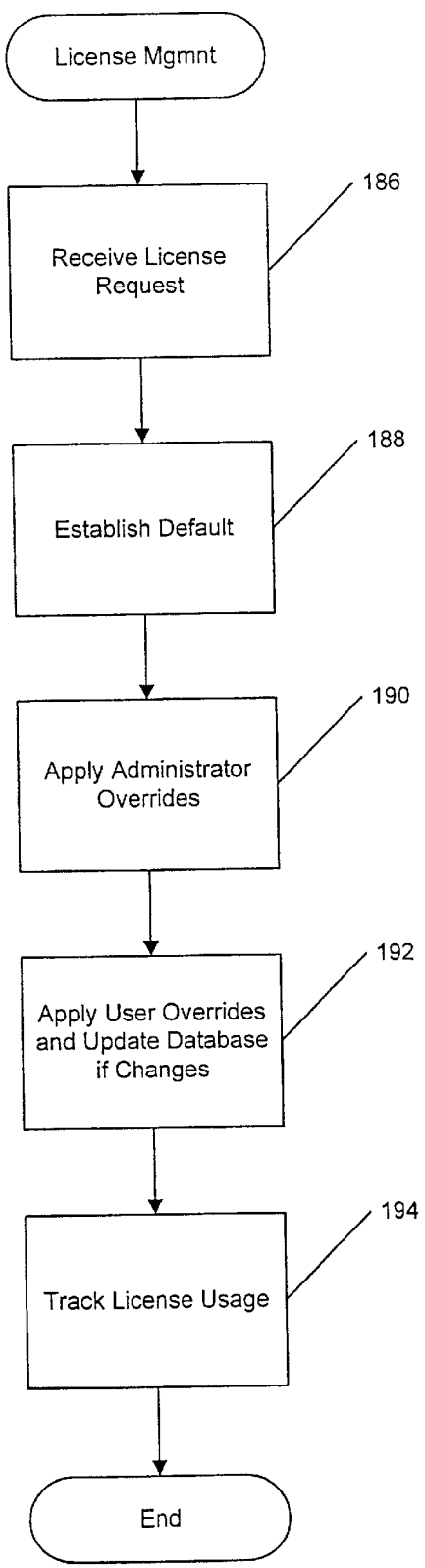
FIG. 5 is a flowchart illustrating license use management according to an embodiment of the present invention.

Referring now to FIG. 5, operations utilizing centralized licensed management according to the present invention will now be further described. The server system 22 receives a license request prior to initiating execution of an instance of the application responsive to a user request (block 186). The default license management policies are initially established responsive to a received request using default values which would typically be provided by the software designer with the application (block 188). If any administrator settable policies are supported and available, the administrator overrides are applied to the default license policy (block 190). Finally, if any user settable license policies are enabled for a particular application, the user license policy preferences are used to override the default values (block 192). The customized license policies determinations are then returned back to the initiated instance of the application.

Accordingly, the license management aspects of the present invention provide flexibility both to software designers writing applications and to administrators to change policies but are not otherwise readily modified without rewriting the application. For example, a software designer could provide applications for sale at different prices based on fixed unchangeable license counts as contrasted with different pricing for versions of the application allowing customer modifiable policy and/or license count configuration. Different default sets could be provided for copies of the same application sold to original equipment manufacturers who could then set their own policies and license counts.

In addition to centralized establishment of license management policies, the license management aspects of the present invention further provide for tracking and/or monitoring license usage (block 194). Licenses may be counted and managed by administrators for different users or groups of users to insure, for example, adequate response time, for measuring and reacting to usage rates (such as by rebalancing server capacity) and so on. In addition, a software designer may provide an application allowing administrators to change license use policies depending upon the requesting user. For example, users associated with the headquarters operations or network management department could be made exempt from license count limits while everyone else is subject to license count limits. Accordingly, license policy management may be provided by a centralized server system 22 of the present invention in a manner analogous to that previously described for user preferences.

As was described above with respect to FIGS. 2–5, the configurable application program aspects of the present invention support separate user preferences for a plurality of users and license policy management. Accordingly, operations as described may be repeated for additional users to obtain additional user sets of preferences which may be saved by on-demand server 22 for execution of the application program for the various users with their personalized information. The application launcher distributed to the various client hardware locations provides the appropriate interface for not only execution of the application program itself, but for the user preference selection input. User preferences obtained through the application launcher program at any individual client station may then be made available by on-demand server 22 to that user regardless of the particular client station at which the particular user is working. Furthermore, while the descriptions above were primarily limited to the example of a single application program, it is to be understood that the methods and systems of the present invention will typically be utilized to support a plurality of different applications which are distributed and made available for use on computer network system 10. Preferably, individual software developers will provide appropriate application launcher program and configuration management programs with a specification of user and administrator settable preference sets suitable for use according to the methods and systems of the present invention.

As will be appreciated by those of skill in this art, the above-described aspects of the present invention in the figures may be provided by hardware, software, or a combination of the above. Various components of the application management system of the present invention may, in practice, be implemented by a microcontroller including input and output ports and running software code, by custom or hybrid integrated circuits, by discrete components or by a combination of the above. Similarly, various of the operations, may be implemented as software programs, such as JAVA™ applets, executing on a workstation, such as servers 22, 22' or clients 24, 24', 26, 26". More generally, as described above, operations according to the present invention may be realized in the hardware of existing on-demand servers 22, 22' which, when so configured, provide an application management system for a network according to the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for management of license use for a network comprising the steps of:

maintaining license management policy information for a plurality of application programs at a license management server, the license management policy information including at least one of a user identity based policy, an administrator policy override definition or a user policy override definition;

receiving at the license management server a request for a license availability of a selected one of the plurality of application programs from a user at a client;

determining the license availability for the selected one of the plurality of application programs for the user based on the maintained license management policy information; and providing an unavailability indication to the client responsive to the selection if the license availability indicates that a license is not available for the user or an availability indication if the licensed availability indicates that a license is available for the user.

2. A method according to claim 1 wherein the receiving step includes the step of receiving the request from an application launcher program associated with the selected one of the plurality of application programs and wherein the step of providing includes the step of providing at least one of the unavailability and the availability indication to the application launcher program associated with the selected one of the plurality of application programs.

3. A method according to claim 1 wherein the license management server is an on demand server associated with the client which provides an instance of the selected one of the application programs to the client for execution.

4. A method according to claim 1 wherein ones of the plurality of application programs have associated default policies and wherein the at least one of a user identity based policy, an administrator policy override definition or a user policy override definition comprises at least one of an administrator policy override definition or a user policy override definition that defines ones of the associated default policies that may be modified by an administrator or user.

5. The method of claim 1 wherein the at least one of a user identity based policy, an administrator policy override definition or a user policy override definition comprises a user identity based policy associated with a group of users.

6. The method of claim 1 wherein the at least one of a user identity based policy, an administrator policy override definition or a user policy override definition defines a policy for managing at least one of a response time or a usage rate.

7. A license use management system for a network comprising:

means for maintaining license management policy information for a plurality of application programs at a license management server, the license management policy information including at least one of a user identity based policy, an administrator policy override definition or a user policy override definition;

means for receiving at the license management server a request for a license availability of a selected one of the plurality of application programs from a user at a client;

means for determining the license availability for the selected one of the plurality of application programs for the user based on the maintained license management policy information; and means for providing an unavailability indication to the client responsive to the selection if the license availability indicates that a license is not available for the user or an availability indication if the licensed availability indicates that a license is available for the user.

8. A system according to claim 7 wherein the means for receiving includes means for receiving the request from an application launcher program associated with the selected one of the plurality of application programs and wherein the means for providing includes means for providing at least one of the unavailability and the availability indication to the application launcher program associated with the selected one of the plurality of application programs.

9. A system according to claim 7 wherein the license management server is an on demand server associated with the client which provides an instance of the selected one of the application programs to the client for execution.

10. A system according to claim 7 wherein ones of the plurality of application programs have associated default policies and wherein the at least one of a user identity based policy, an administrator policy override definition or a user policy override definition comprises at least one of an administrator policy override definition or a user policy override definition that defines ones of the associated default policies that may be modified by an administrator or user.

11. The system of claim 7 wherein the at least one of a user identity based policy, an administrator policy override definition or a user policy override definition comprises a user identity based policy associated with a group of users.

12. The system of claim 7 wherein the at least one of a user identity based policy, an administrator policy override definition or a user policy override definition defines a policy for managing at least one of a response time or a usage rate.

13. A computer program product for license use management for a network, the computer program product comprising:

a computer readable storage medium having computer-readable program code means embodied in said medium, said computer-readable program code means comprising:

computer readable program code means for maintaining license management policy information for a plurality of application programs at a license management server, the license management policy information including at least one of a user identity based policy, an administrator policy override definition or a user policy override definition;

computer readable program code means for receiving at the license management server a request for a license availability of a selected one of the plurality of application programs from a user at a client;

computer readable program code means for determining the license availability for the selected one of the plurality of application programs for the user based on the maintained license management policy information; and computer readable program code means for providing an unavailability indication to the client responsive to the selection if the license availability indicates that a license is not available for the user or an availability indication if the licensed availability indicates that a license is available for the user.

14. A computer program product according to claim 13 wherein the computer readable program code means for receiving includes computer readable program code means for receiving the request from an application launcher program associated with the selected one of the plurality of application programs and wherein the computer readable program code means for providing includes computer readable program code means for providing at least one of the unavailability and the availability indication to the application launcher program associated with the selected one of the plurality of application programs.

15. A system according to claim 13 wherein the license management server is an on demand server associated with the client which provides an instance of the selected one of the application programs to the client for execution.

16. A computer program product according to claim 13 wherein ones of the plurality of application programs have associated default policies and wherein the at least one of a user identity based policy, an administrator policy override definition or a user policy override definition comprises at least one of an administrator policy override definition or a user policy override definition that defines ones of the associated default policies that may be modified by an administrator or user.

17. The computer program product of claim 13 wherein the at least one of a user identity based policy, an administrator policy override definition or a user policy override definition comprises a user identity based policy associated with a group of users.

18. The computer program product of claim 13 wherein the at least one of a user identity based policy, an administrator policy override definition or a user policy override definition defines a policy for managing at least one of a response time or a usage rate.

* * * * *